US008890965B2

(12) United States Patent
Edwards et al.

(10) Patent No.: US 8,890,965 B2
(45) Date of Patent: *Nov. 18, 2014

(54) SYSTEM AND METHOD FOR EFFICIENTLY TRANSFERRING DATA FROM AN ELECTRONIC CAMERA DEVICE

(71) Applicants: Sony Corporation, Tokyo (JP); Sony Electronics Inc., Park Ridge, NJ (US)

(72) Inventors: Eric Edwards, Kealakekua, HI (US); Neal Manowitz, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,446

(22) Filed: Aug. 26, 2013

(65) Prior Publication Data

US 2013/0335586 A1 Dec. 19, 2013

Related U.S. Application Data

(63) Continuation of application No. 13/328,184, filed on Dec. 16, 2011, now Pat. No. 8,558,904, which is a continuation of application No. 12/291,871, filed on Nov. 14, 2008, now Pat. No. 8,120,662, which is a continuation of application No. 09/784,429, filed on Feb. 15, 2001, now Pat. No. 7,468,744.

(60) Provisional application No. 60/187,184, filed on Mar. 6, 2000.

(51) Int. Cl.
| H04N 5/232 | (2006.01) |
| G06F 17/30 | (2006.01) |
| H04N 5/225 | (2006.01) |
| G06F 15/16 | (2006.01) |

(52) U.S. Cl.
CPC ........ *G06F 17/3028* (2013.01); *H04N 5/23206* (2013.01)
USPC .................. 348/211.1; 348/211.6; 348/207.1; 709/232

(58) Field of Classification Search
USPC .......... 348/207.1, 208.6, 211.1, 211.6, 231.1, 348/231.9
See application file for complete search history.

(56) References Cited

U.S. PATENT DOCUMENTS

| 5,128,776 A * | 7/1992 | Scorse et al. .................. 382/240 |
| 5,737,491 A * | 4/1998 | Allen et al. .................... 704/270 |
| 5,806,005 A * | 9/1998 | Hull et al. ...................... 455/566 |
| 5,861,918 A * | 1/1999 | Anderson et al. .......... 348/231.9 |
| 6,058,304 A * | 5/2000 | Callaghan et al. .......... 455/422.1 |
| 6,167,469 A * | 12/2000 | Safai et al. ....................... 710/62 |
| 6,246,839 B1 * | 6/2001 | Ichimasa et al. .............. 396/406 |
| 6,256,059 B1 * | 7/2001 | Fichtner ..................... 348/222.1 |

(Continued)

*Primary Examiner* — Kelly L Jerabek
(74) *Attorney, Agent, or Firm* — Gregory J. Koerner; Redwood Patent Law

(57) ABSTRACT

A system and method for efficiently transferring data from an electronic camera device includes a camera device that is configured to capture image data and temporarily store the image data into an economical limited local buffer memory. A transfer manager from the camera device may then periodically arbitrate for access to a wireless communications network, and may transfer the captured image data from the buffer memory to a designated data destination, such as an image service on a distributed computer network like the Internet. A system user may then efficiently access the transferred image data from a dedicated storage location on the data destination by utilizing any appropriate data-access device, such as a personal computer device or a portable electronic device.

20 Claims, 9 Drawing Sheets

(56) References Cited

U.S. PATENT DOCUMENTS

| | | | |
|---|---|---|---|
| 6,300,976 B1 * | 10/2001 | Fukuoka | 348/231.99 |
| 6,317,639 B1 * | 11/2001 | Hansen | 700/83 |
| 6,392,697 B1 * | 5/2002 | Tanaka et al. | 348/220.1 |
| 6,393,470 B1 * | 5/2002 | Kanevsky et al. | 709/219 |
| 6,522,352 B1 * | 2/2003 | Strandwitz et al. | 348/211.2 |
| 6,668,134 B1 * | 12/2003 | Niikawa | 386/235 |
| 6,701,058 B1 * | 3/2004 | Tsubaki | 386/226 |
| 7,468,744 B2 * | 12/2008 | Edwards et al. | 348/211.1 |
| 8,120,662 B2 * | 2/2012 | Edwards et al. | 348/211.1 |
| 2013/0155259 A1 * | 6/2013 | Edwards et al. | 348/207.1 |

* cited by examiner

SYSTEM AND METHOD FOR EFFICIENTLY TRANSFERRING DATA FROM AN ELECTRONIC CAMERA DEVICE

CROSS-REFERENCE TO RELATED APPLICATIONS

This application relates to, and claims priority in, U.S. Provisional Patent Application Ser. No. 60/187,184, entitled "Wireless Digital Camera With Remote Storage" that was filed on Mar. 6, 2000, and as a Continuation application to U.S. Non-Provisional patent application Ser. No. 09/784,429, entitled "System And Method For Efficiently Transferring Data From An Electronic Camera Device" that was filed on Feb. 15, 2001, and as a Continuation application to U.S. Non-Provisional patent application Ser. No. 12/291,871, entitled "System And Method For Efficiently Transferring Data From An Electronic Camera Device" that was filed on Nov. 14, 2008, and as a Continuation application to U.S. Non-Provisional patent application Ser. No. 13/328,184, entitled "System And Method For Efficiently Transferring Data From An Electronic Camera Device" that was filed on Dec. 16, 2011. The foregoing related applications are commonly assigned, and are hereby incorporated by reference.

BACKGROUND SECTION

1. Field of the Invention

This invention relates generally to techniques for transferring data, and relates more particularly to a system and method for efficiently transferring data from an electronic camera device.

2. Description of the Background Art

Implementing efficient methods for transferring data is a significant consideration for designers and manufacturers of contemporary electronic devices. However, efficiently transferring data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively stores, displays, and transfers digital image data may benefit from an efficient implementation because of the large amount and complexity of the digital data involved.

Due to growing demands on system resources and substantially increasing data magnitudes, it is apparent that developing new techniques for transferring data is a matter of concern for related electronic technologies. Therefore, for all the foregoing reasons, developing effective systems for transferring data remains a significant consideration for designers, manufacturers, and users of contemporary electronic devices.

SUMMARY

In accordance with the present invention, a system and method are disclosed for efficiently transferring data from an electronic camera device. In one embodiment, initially, an appropriate entity such as a system user or a system manufacturer may preferably provide relevant identification information to the camera device for performing one or more data transfers. The foregoing identification information may include any appropriate subject matter. For example, the identification information may preferably include a user identifier and/or a destination identifier.

Next, a system user may preferably capture one or more sets of image data using the camera device, and a camera application in the camera device may responsively store the captured image data into local data buffers. A transfer manager in the camera device may then arbitrate for access to a communication path to a particular data destination. In certain embodiments, the foregoing communication path may preferably be implemented as part of a wireless communication network.

The transfer manager may initiate an arbitration procedure for access to the wireless network in any appropriate manner. For example, the transfer manager may monitor the data buffers, and automatically initiate an arbitration procedure when the amount of data in the data buffers exceeds a predetermined threshold. Alternately, the transfer manager may initiate an arbitration procedure in response to system user input.

Furthermore, the transfer manager may perform the foregoing arbitration procedure using any effective technique(s). For example, the transfer manager may refer to the destination identifier discussed above to identify the designated data destination. The transfer manager may then negotiate with the foregoing wireless network for sufficient bandwidth to transfer all or part of the data in the data buffers to the designated data destination.

After establishing a communication path via the wireless network, the transfer manager may preferably transfer all or part of the data from the data buffers onto the wireless network, which may preferably route the data received from the camera device to the designated data destination. In certain embodiments, the wireless network may preferably refer to the destination identifier discussed above to identify the designated data destination.

After receiving the transferred data from the wireless network, a controller of the data destination may preferably analyze various identification information that may preferably be transmitted along with the data. As mentioned above, the foregoing identification information may preferably include a user identifier, such as an account number or a camera identification number, to enable the controller of the data destination to correctly store the received data into an appropriate one of the data file locations of the data destination.

After confirming that the transfer of the data and all related information from the camera device has been successfully completed, the controller of the data destination may preferably send a transfer confirmation via the wireless network to the transfer manager of the camera device. A display manager may responsively provide a confirmation message on a user interface of the camera device.

After previously identifying the source of the transferred data, the controller of the data destination may preferably store the transferred data into an appropriate designated one of the data files that corresponds to a particular system user or data source. Finally, a system user may advantageously access and utilize the transferred data from an appropriate one or more of the data files of the data destination using any effective technique(s). For example, a system user may utilize a local personal computer device to access the data destination via an electronic wireless or hard-wired network.

The present invention therefore provides an efficient and effective way to circumvent certain burdensome difficulties often associated with storing and transferring image data via various types of local storage media. Instead, the present invention provides a user-friendly, trouble-free, and cost-effective method for transferring, accessing and utilizing captured image data through a wireless data transfer procedure. The present invention thus provides an improved system and method for efficiently transferring data from an electronic camera device.

DETAILED DESCRIPTION

The present invention relates to an improvement in data transfer techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently transferring data from an electronic camera device, and preferably may include a camera device that is configured to capture image data and temporarily store the image data into a local buffer memory. A transfer manager from the camera device may then periodically arbitrate for access to a wireless communications network, and may preferably transfer the captured image data from the buffer memory to a designated data destination, such as an image service on a distributed computer network like the Internet. A system user may then efficiently access the transferred image data from a dedicated storage location of the data destination by utilizing an appropriate data-access device, such as a personal computer device.

Figure 1:
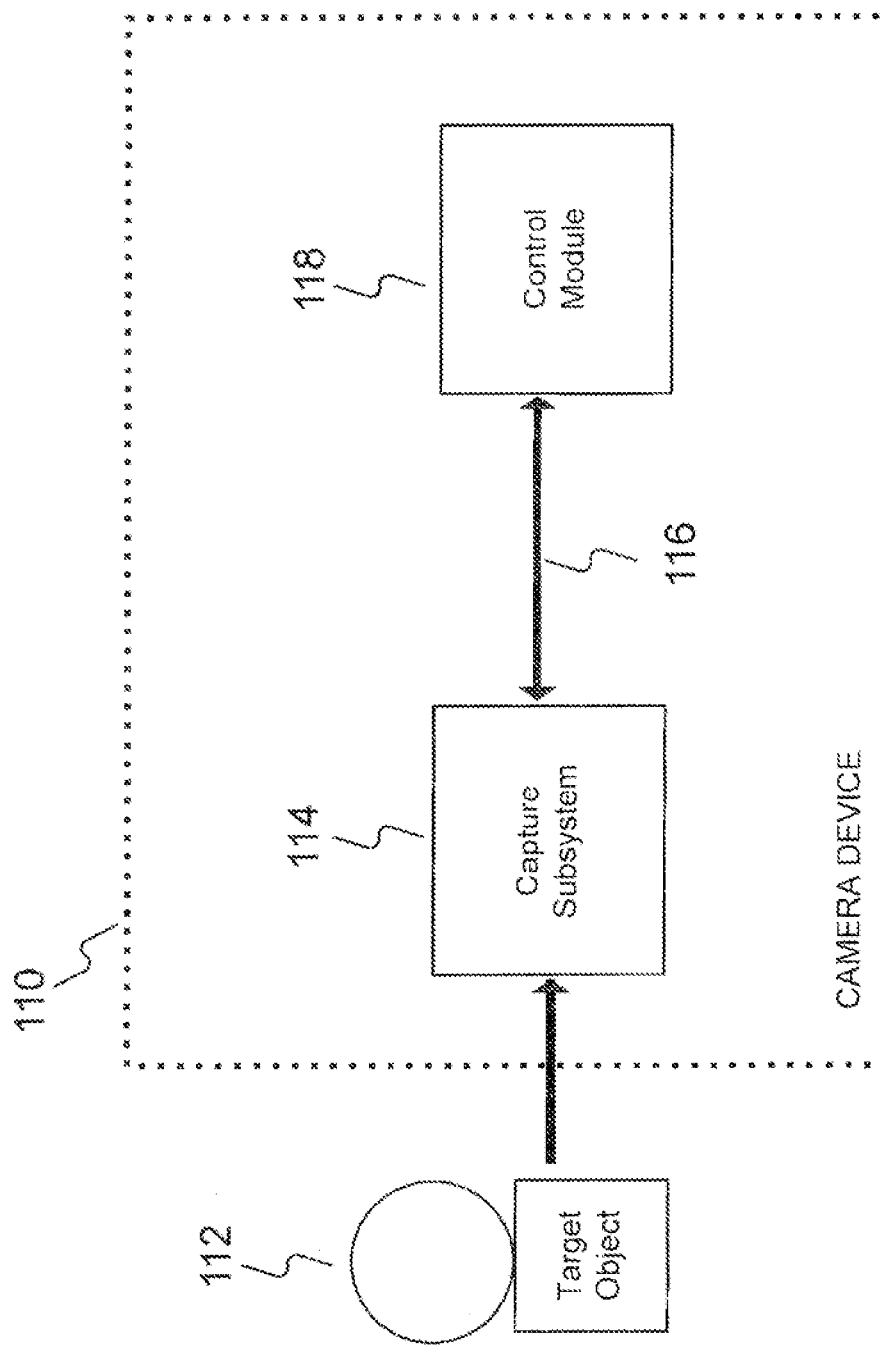
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as another type of portable electronic device, such as a scanner device or a hand-held personal digital assistant device.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
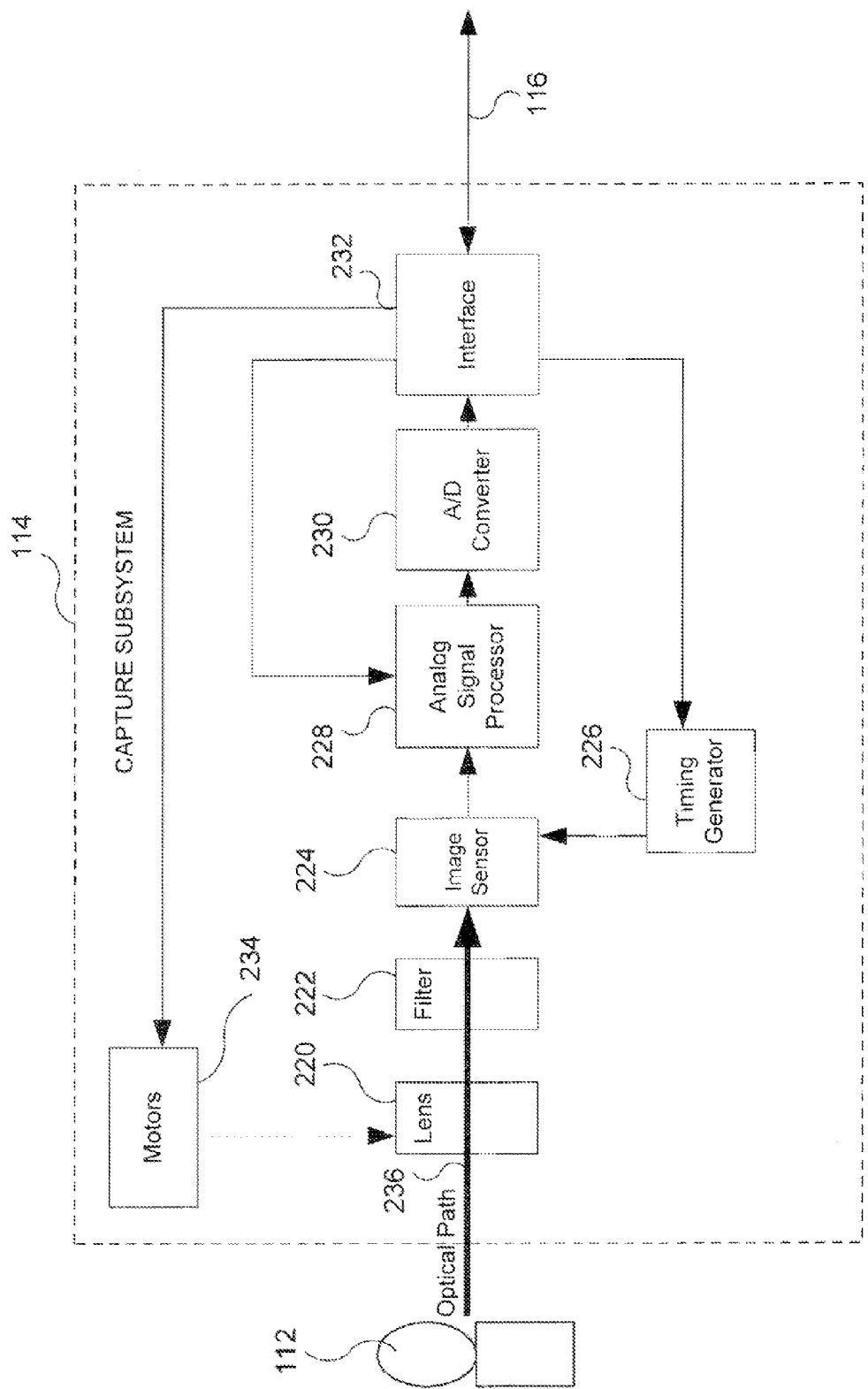
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises a lens 220 having an iris (not shown), a filter 222, an image sensor 224, a timing generator 226, an analog signal processor (ASP) 228, an analog-to-digital (A/D) converter 230, an interface 232, a data input 250, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through ASP 228, A/D converter 230, and interface 232. Interface 232 may preferably include separate interfaces for controlling ASP 228, motors 234 and timing generator 226. From interface 232, the image data passes over system bus 116 to control module 118 for appropriate processing and storage.

Figure 3:
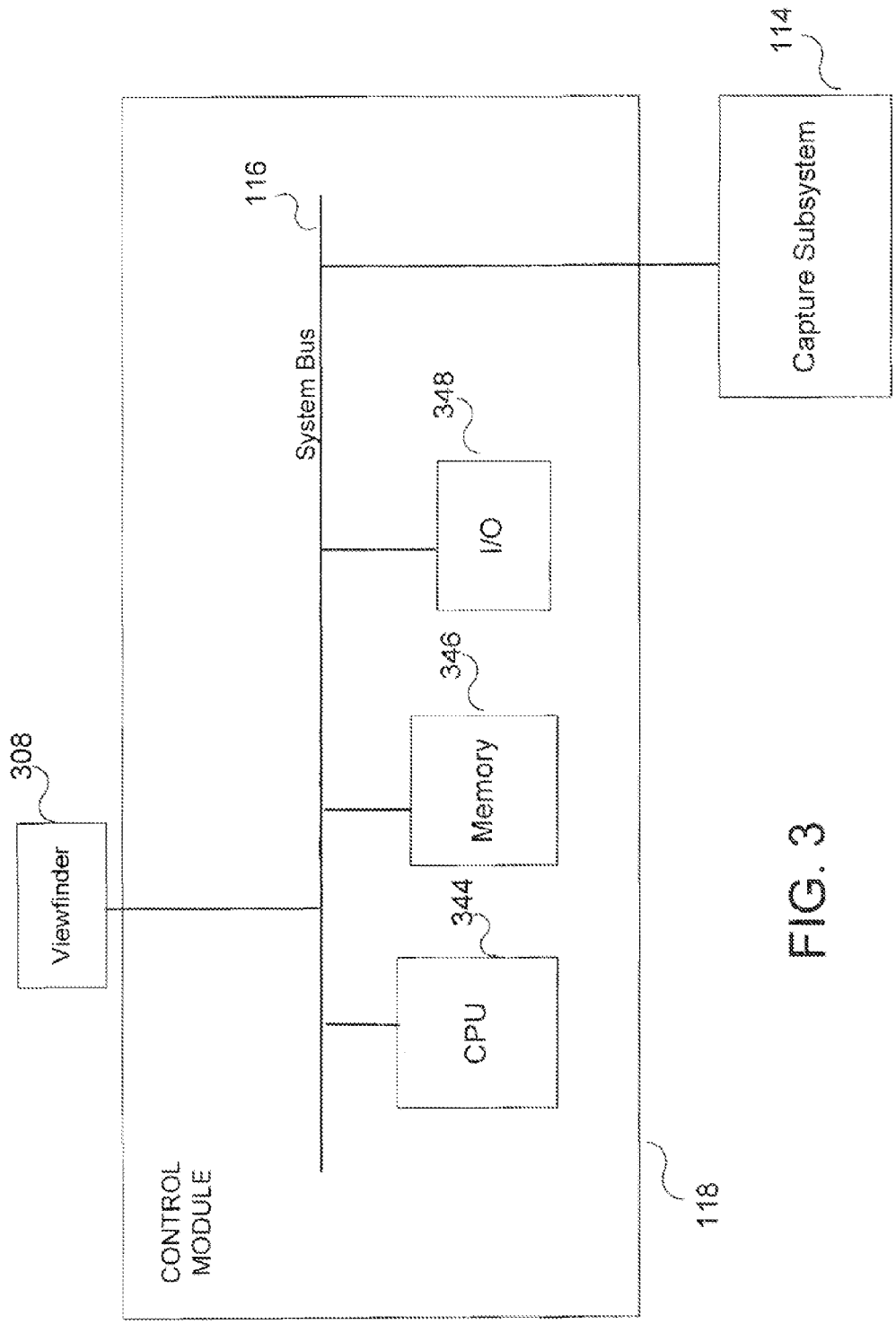
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 8.

Figure 4:
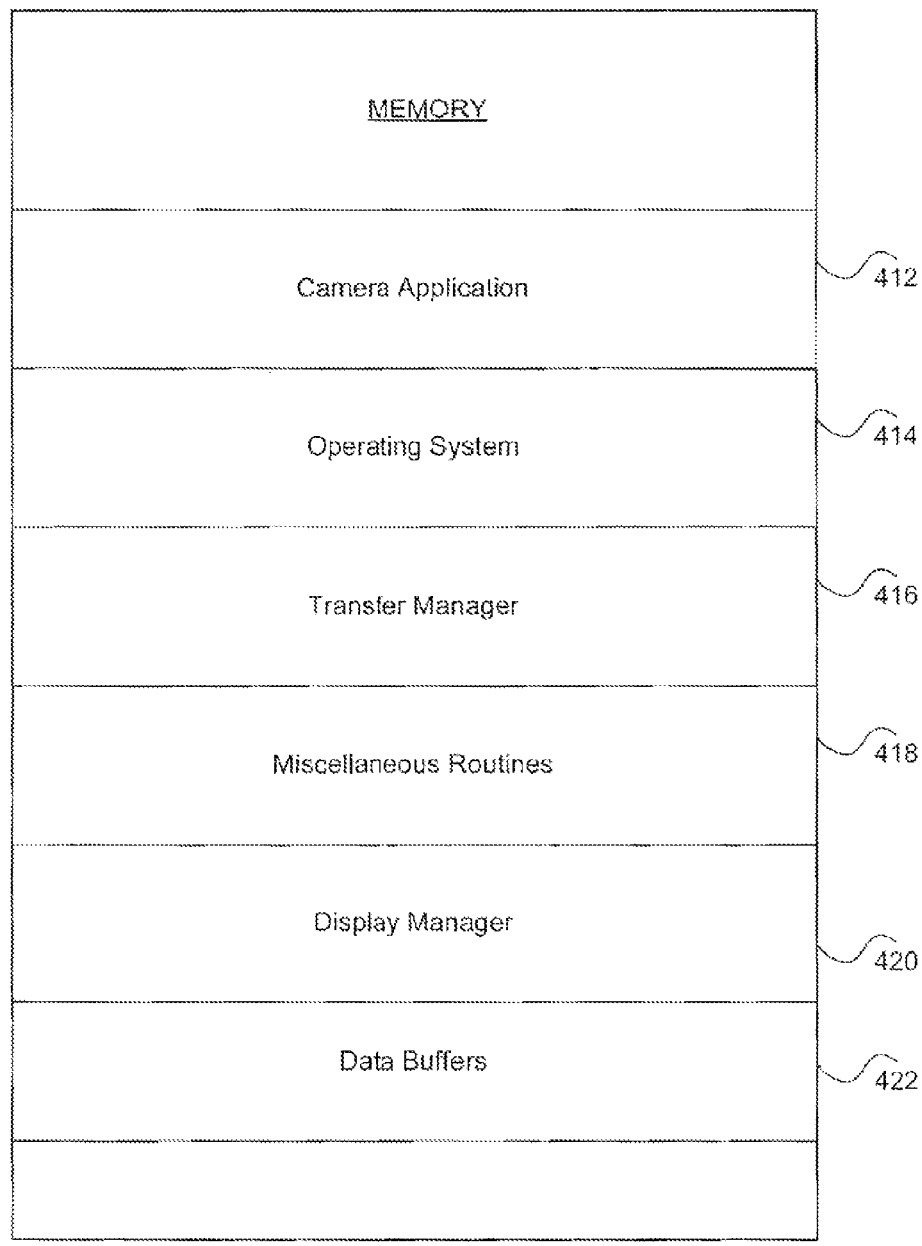
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may preferably include, but is not limited to, a camera application 412, an operating system 414, a transfer manager 416, miscellaneous routines 418, a display manager 420, and data buffers 422. In alternate embodiments, memory 346 may readily include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, transfer manager 416 may preferably control and coordinate bi-directional communications between camera device 110 and one or more designated data destinations. In certain embodiments, camera device 110 may function as a data source for wirelessly providing various types of image data and other information to a location or service on the Internet or other distributed computer network. For example, transfer manager 416 may include an Internet browser module to allow camera device 110 to download or upload information to or from the Internet. The operation and utilization of transfer manager is further discussed below in conjunction with FIGS. 8 and 9.

Miscellaneous routines 418 may include any desired software instructions to facilitate functions performed by camera device 110. For example, miscellaneous routines 418 may include a data transformation routine that translates an initial format of captured image data into an uploadable format of the same image data that is compatible with a selected data destination.

Display manager 420 preferably coordinates and controls the presentation of appropriate visual information on viewfinder 308 in response to instructions from application software 412 or transfer manager 416. In the FIG. 4 embodiment, data buffers 422 may preferably be economically implemented and configured to provide a limited amount of local memory for temporarily storing one or more sets of captured image data and other information. In accordance with the present invention, transfer manager 416 may advantageously transfer the contents of data buffers 422 to a designated data destination at an appropriate time by utilizing any appropriate technique(s), including an automatic or user-initiated wireless transmission procedure. The configuration of data buffers 422 is further discussed below in conjunction with FIG. 5.

Figure 5:
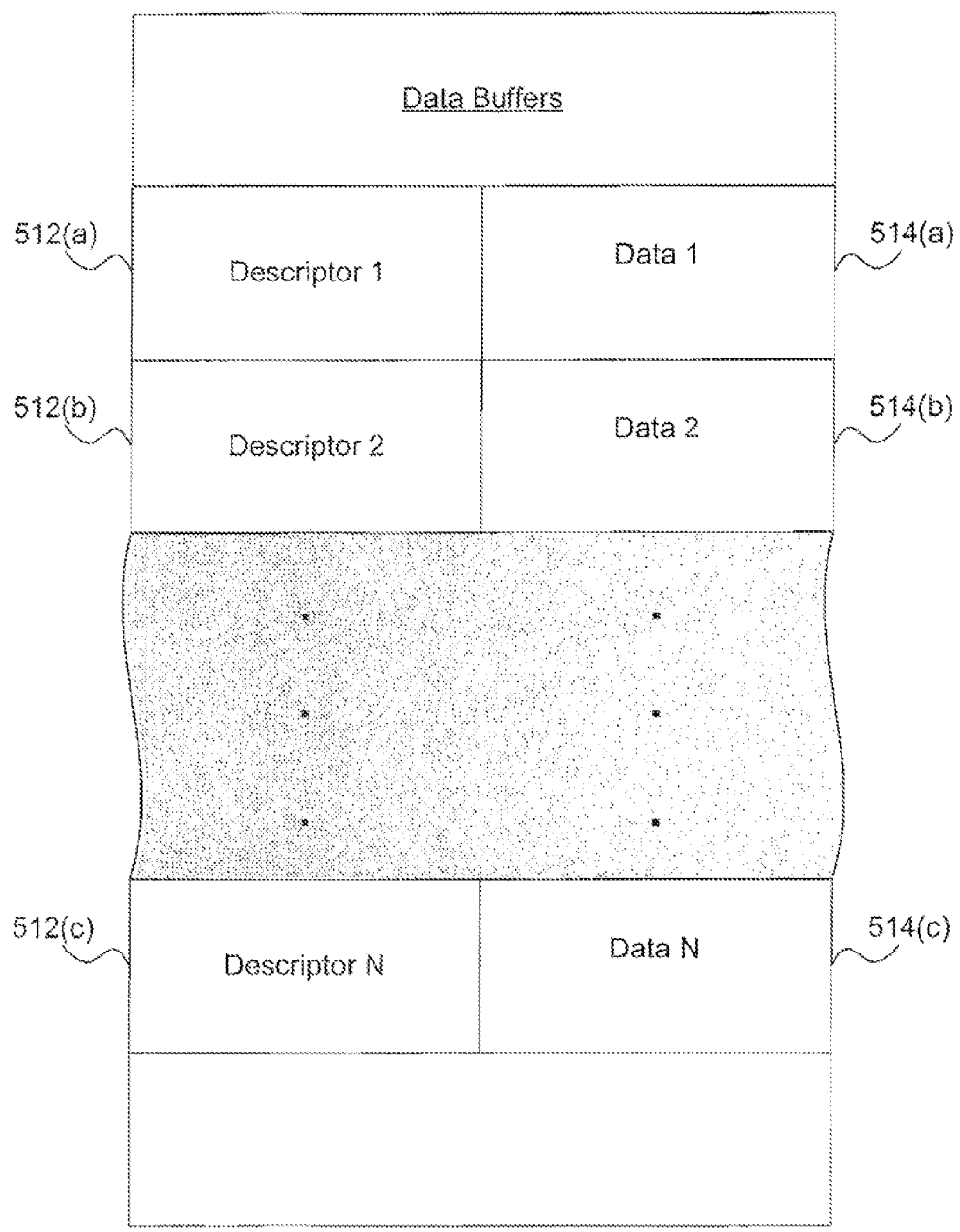
FIG. 5 is a block diagram for one embodiment of the data buffers of FIG. 4, in accordance with the present invention.

Referring now to FIG. 5, a block diagram for one embodiment of the FIG. 4 data buffers 422 is shown, in accordance with the present invention. In alternate embodiments of the present invention, data buffers 422 may readily be implemented to include various other configurations, and may also include various items and components that are different from those discussed in conjunction with the FIG. 5 embodiment.

In the FIG. 5 embodiment, data buffers 422 preferably may include individual sets of data 1 (514(*a*)) through data N (514(*c*)) that each preferably corresponds with a specific captured image or other type of stored information. Data buffers 422 may include any number of individual sets of data 514, however, in certain embodiments, data buffers 422 may preferably be economically implemented to store only a limited number of individual sets of data 514.

In the FIG. 5 embodiment, data buffers 422 preferably may also include a descriptor 1 (512(*a*)) through a descriptor N (512(*c*)) that each is preferably associated with a different respective set of data 514 in data buffers 422. In alternate embodiments, data buffers 422 may be configured to include one or more single descriptors 512 that describe multiple sets of data 514. In addition, in certain embodiments, data buffers 422 may be implemented without utilizing descriptor(s) 512.

In the FIG. 5 embodiment, descriptors 512 may include any appropriate information related to a corresponding set of data 514. For example, a descriptor 512 may include information regarding the system user or particular camera device 110. For example, descriptors 512 may include a user identifier number, a camera identifier number, or a user account number. In addition, descriptors 512 may include appropriate information for instructing transfer manager 416 to which data destination a particular set of data 514 is to be transmitted, such as a routing identifier number or a data destination identifier. In accordance with the present invention, transfer manager 416 may route and a given data destination may identify a set of data 514 by using descriptors 512 and other effective means.

Figure 6:
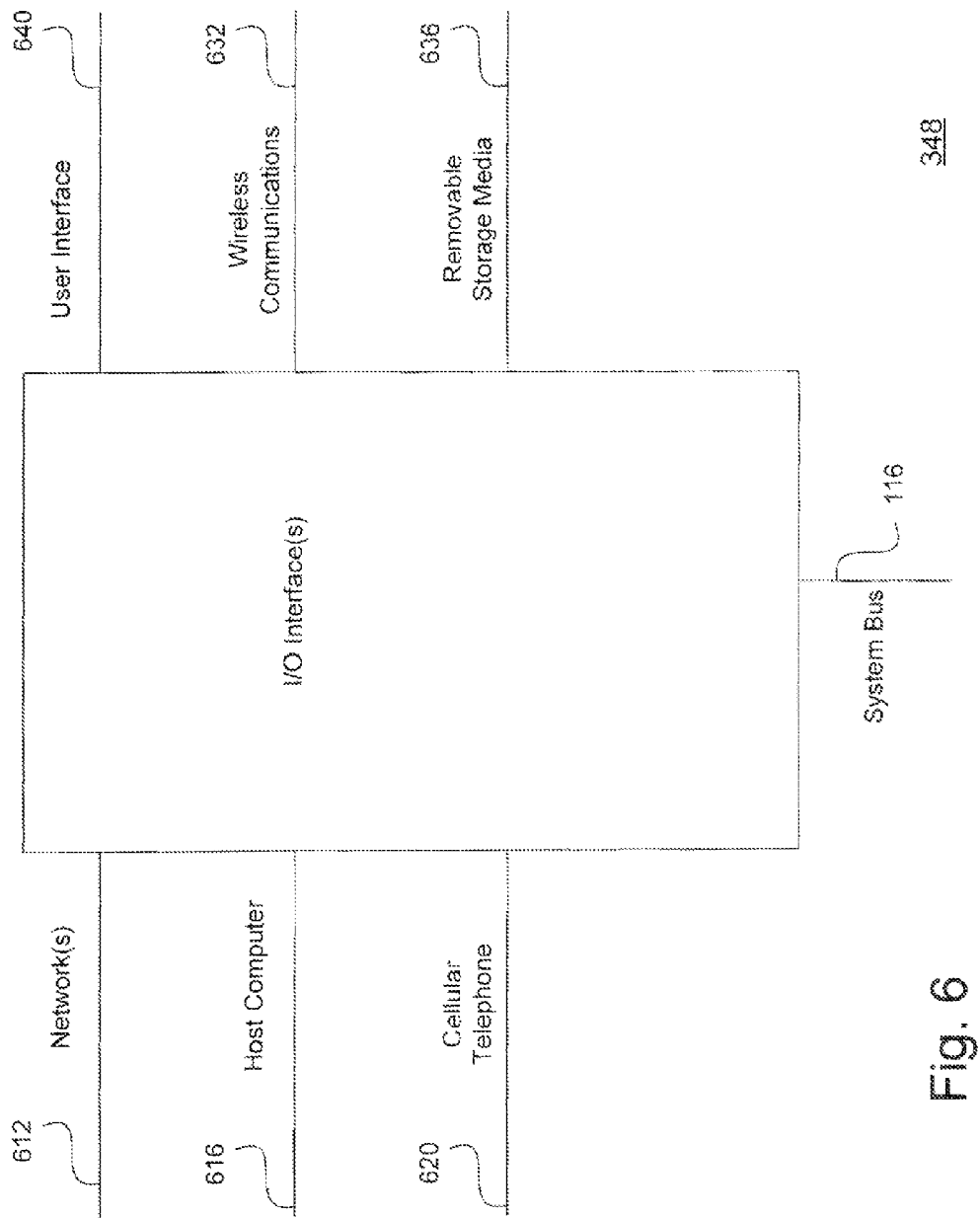
FIG. 6 is a block diagram for one embodiment of the I/O interface(s) of FIG. 3, in accordance with the present invention.

Referring now to FIG. 6, a block diagram for one embodiment of the FIG. 3 I/O interface(s) 348 is shown, in accordance with the present invention. In the FIG. 5 embodiment, I/O interface(s) 348 preferably may communicate with various input or output entities that may include, but are not limited to, network(s) 612, a host computer 616, a cellular telephone 620, wireless communications 632, removable storage media 636, an a user interface 640. I/O interface(s) 348 may preferably communicate with camera device 110 via system bus 116. In alternate embodiments, I/O interface(s) 348 may readily include various other elements and functionalities in addition to, or instead of, those discussed in conjunction with the FIG. 6 embodiment. In addition, I/O interface(s) 348 may be implemented and configured using any effective technology or method.

In the FIG. 6 embodiment, camera device 110 may utilize I/O interface(s) 348 to bi-directionally communicate with one or more network(s) 612. For example, camera device 110 may advantageously communicate with the Internet or other distributed computer networks to upload or download various types of information. Camera device 110 may also utilize I/O interface(s) 348 to bi-directionally communicate with a host computer 616. For example, camera device 110 may communicate with a personal computer device over a Universal Serial Bus (USB) to effectively upload or download various types of information. In the FIG. 6 embodiment, camera device 110 may utilize I/O interface(s) 348 to bi-directionally communicate with a cellular telephone 620 to preferably provide or transfer any desired information for enabling flexible functionality of camera device 110.

In the FIG. 6 embodiment, camera device 110 may also utilize I/O interface(s) 348 to bi-directionally communicate with various types of wireless communications 632. Wireless communications 632 preferably may include any effective means to remotely communicate with an external entity such as an Internet server or distributed computer network, to thereby exchange relevant information for successful operation of camera device 110. In certain embodiments, wireless communications 632 may also provide various status and control information from an external entity. Wireless communications 632 may be implemented using any appropriate wireless technology, including radio-frequency transmission, infra-red transmission, or micro-wave transmission.

In the FIG. 6 embodiment, removable storage media 636 may preferably be utilized to receive or provide any desired information for facilitating the operation of camera device 110. For example, removable storage media 636 may provide means for bi-directional transfers of information between camera device 110 and other appropriate entities, such as another digital camera device or a host computer. In certain embodiments, removable storage media 636 may include memory devices to support any desired type or combination of removable storage media. For example, removable storage media 636 may include memory sticks, flash memory devices, compact disks, mini-disks, or floppy disks.

In addition to the various foregoing enumerated types of I/O interface(s) 348, camera device 110 may preferably also include any required types of physical interfaces or connectors (not shown) for coupling camera device 110 with other hardware devices to support bi-directional electronic communications.

In the FIG. 6 embodiment, user interface 640 may preferably include any effective means to allow a system user to interactively communicate with camera device 110. For example, user interface 640 may support a keyboard device, a wireless remote control device, a speech-recognition module with corresponding microphone, a graphical user interface with touch-screen capability, or a selection button array mounted externally on camera device 110.

In certain embodiments, camera device 110 may be economically implemented with a simplified version of I/O interface(s) 348 that include an interface to wireless communications 632, but that does not includes one or more of the other interfaces shown in the FIG. 6 embodiment. For example, in certain embodiments, camera device 110 may utilize wireless communications 632 to download all captured image data, and therefore I/O interface(s) 348 may not include or support one or more of removable storage media 636, networks 612, host computer 616, or cellular telephone 620.

Figure 7:
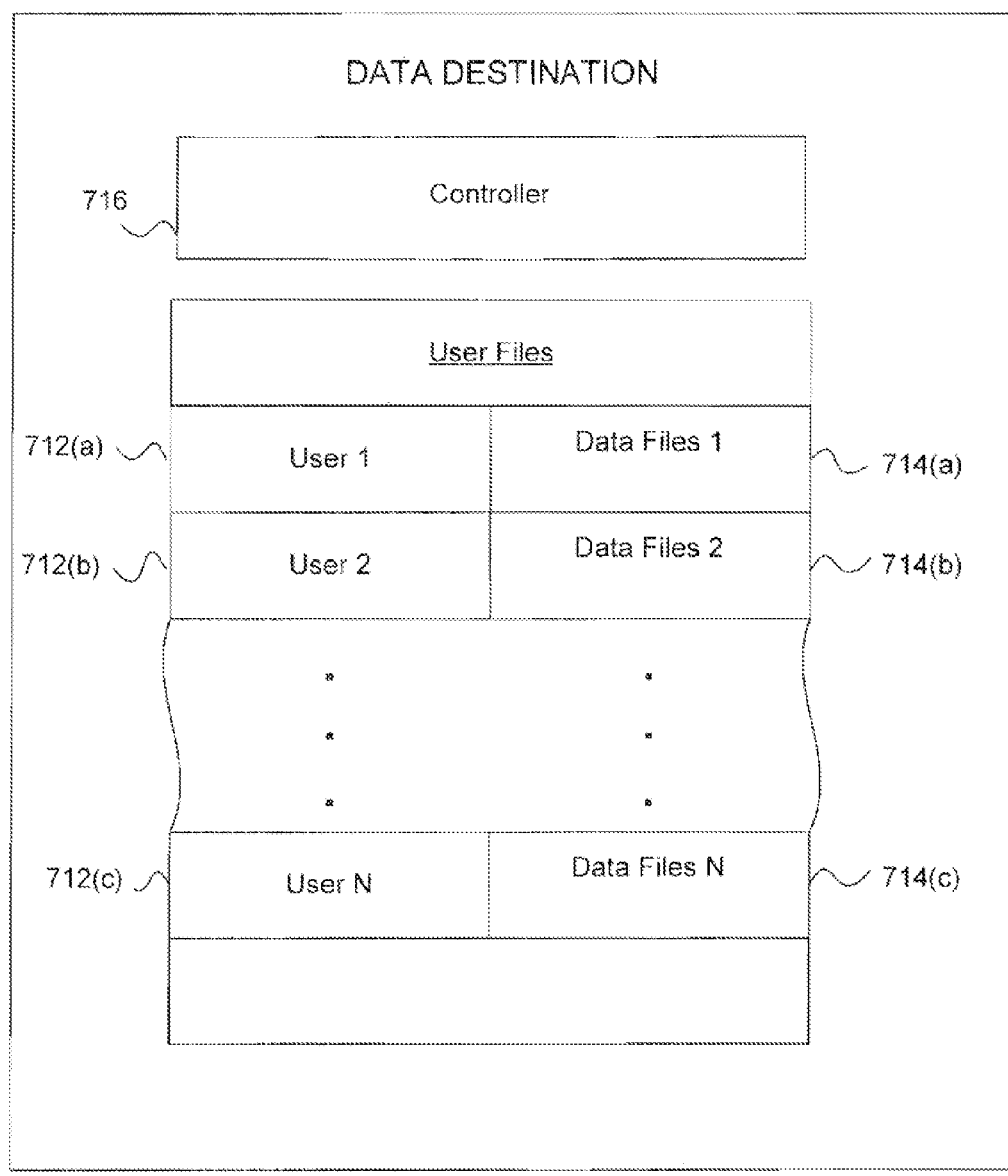
FIG. 7 is a block diagram of an exemplary data destination, in accordance with one embodiment of the present invention.

Referring now to FIG. 7, a block diagram for one embodiment of an exemplary data destination 710 is shown, in accordance with the present invention. In alternate embodiments of the present invention, data destination 710 may readily be implemented to include various other configurations, and may also include various items and components that are different from those discussed in conjunction with the FIG. 7 embodiment. In addition, data destination 710 may be implemented as any appropriate entity. For example, data destination 710 may be implemented as an Internet service provider, a photo processing station, a stand-alone computer or other electronic device, or an image service on a distributed computer network like the Internet.

In the FIG. 7 embodiment, data destination 710 preferably may include a controller 716 and individual data files 1 (714(a)) through data files N (714(c)) that each preferably corresponds with a specific system user, camera device 110, or other identifiable entity. In the FIG. 7 embodiment, each of data files 714 may include one or more individual sets of data, such as captured image data from various camera devices 110.

In the FIG. 7 embodiment, data destination 710 may also include a user identifier 1 (712(a)) through a user identifier N (712(c)) that is each preferably associated with a different respective system user or billing account that is utilizing data destination 710. In alternate embodiments, data destination 710 may be configured to include one or more single user identifiers 412 that describe multiple data files 714. In addition, in certain embodiments, data destination 710 may be implemented without utilizing user identifiers 712.

In operation, controller 716 may preferably receive transmitted image data and other information from various camera devices 110. In response, controller 716 may preferably identify the source of the transmitted data, and store the transmitted data into an appropriate one of the data files 714. A system user may then subsequently access data destination 710 using any appropriate technique to obtain, manipulate, and utilize the information in a corresponding one or more of the data files 714. The operation and utilization of data destination 710 is further discussed below in conjunction with FIG. 9.

Figure 8:
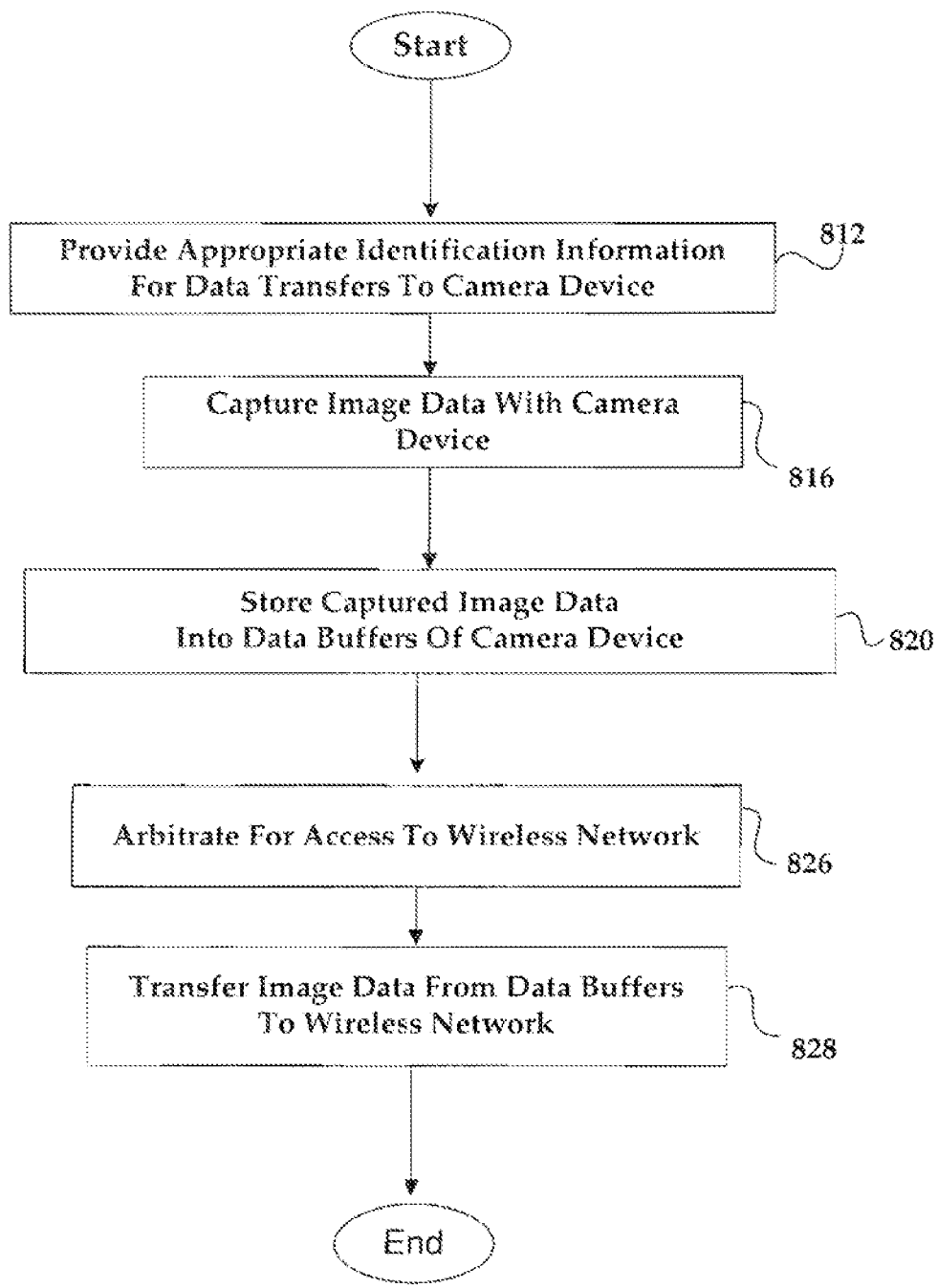
FIG. 8 is a flowchart of method steps for transferring data from an electronic camera device, in accordance with one embodiment of the present invention.

Referring now to FIG. 8, a flowchart of method steps for transferring data from an electronic camera device 110 is shown, in accordance with one embodiment of the present invention. The FIG. 8 embodiment is presented for purposes of illustration, and, in alternate embodiments, the present invention may readily utilize various other steps and sequences than those discussed in conjunction with the FIG. 8 embodiment.

In the FIG. 8 embodiment, in step 812, an appropriate entity, such as a system user or a system manufacturer, may preferably provide relevant identification information to camera device 110 for performing one or more data transfers. The foregoing identification information may include any appropriate subject matter. For example, as discussed above in conjunction with descriptors 512 of FIG. 5, the identification information may preferably include a user identifier and/or a destination identifier. In step 816, a system user may then preferably capture one or more sets of image data 514 using camera device 110. In step 820, a camera application 412 in camera device 110 may responsively store the captured image data 514 into data buffers 422.

Then, in step 826, a transfer manager 416 in camera device 110 may arbitrate for access to a communication path to a particular data destination 710. In the FIG. 8 embodiment, the foregoing communication path may preferably be implemented as part of a wireless communication network. Transfer manager 416 may initiate an arbitration procedure for access to the wireless network in any appropriate manner. For example, transfer manager 416 may monitor data buffers 422 and automatically initiate an arbitration procedure when the amount of data 514 in data buffers 422 exceeds a predetermined threshold. Alternately, transfer manager 416 may initiate an arbitration procedure in response to system user input.

In the FIG. 8 embodiment, transfer manager 416 may perform the foregoing arbitration procedure using any effective technique(s). For example, transfer manager 416 may refer to the destination identifier discussed above in step 812 to identify the designated data destination 710. Transfer manager 416 may then negotiate with the foregoing wireless network for sufficient bandwidth to transfer all or a specifiable portion of the data 514 from data buffers 422 to the designated data destination 710. In the FIG. 8 embodiment, transfer manager 416 and display manager 420 may provide various types of relevant transfer status information regarding a data transfer for viewing on user interface 640 or on viewfinder 308 of camera device 110.

In step 828, after establishing a communication path via the wireless network, transfer manager 416 may preferably transfer all or part of the data 514 from data buffers 422 onto the wireless network. In the FIG. 8 embodiment, if all data 514 in data buffers 422 may not be transferred because of bandwidth limitations on the wireless network (or for any other reasons), then transfer manager 416 may preferably indicate to data destination 710 that additional image data will subsequently be transmitted as part of the same interrupted transmission of data 514. Transfer manager 416 may then preferably return to foregoing step 826 to continue arbitrating for access to the wireless network, in order to complete the interrupted transfer of data 514 from data buffers 422. The FIG. 8 process may then preferably terminate.

Figure 9:
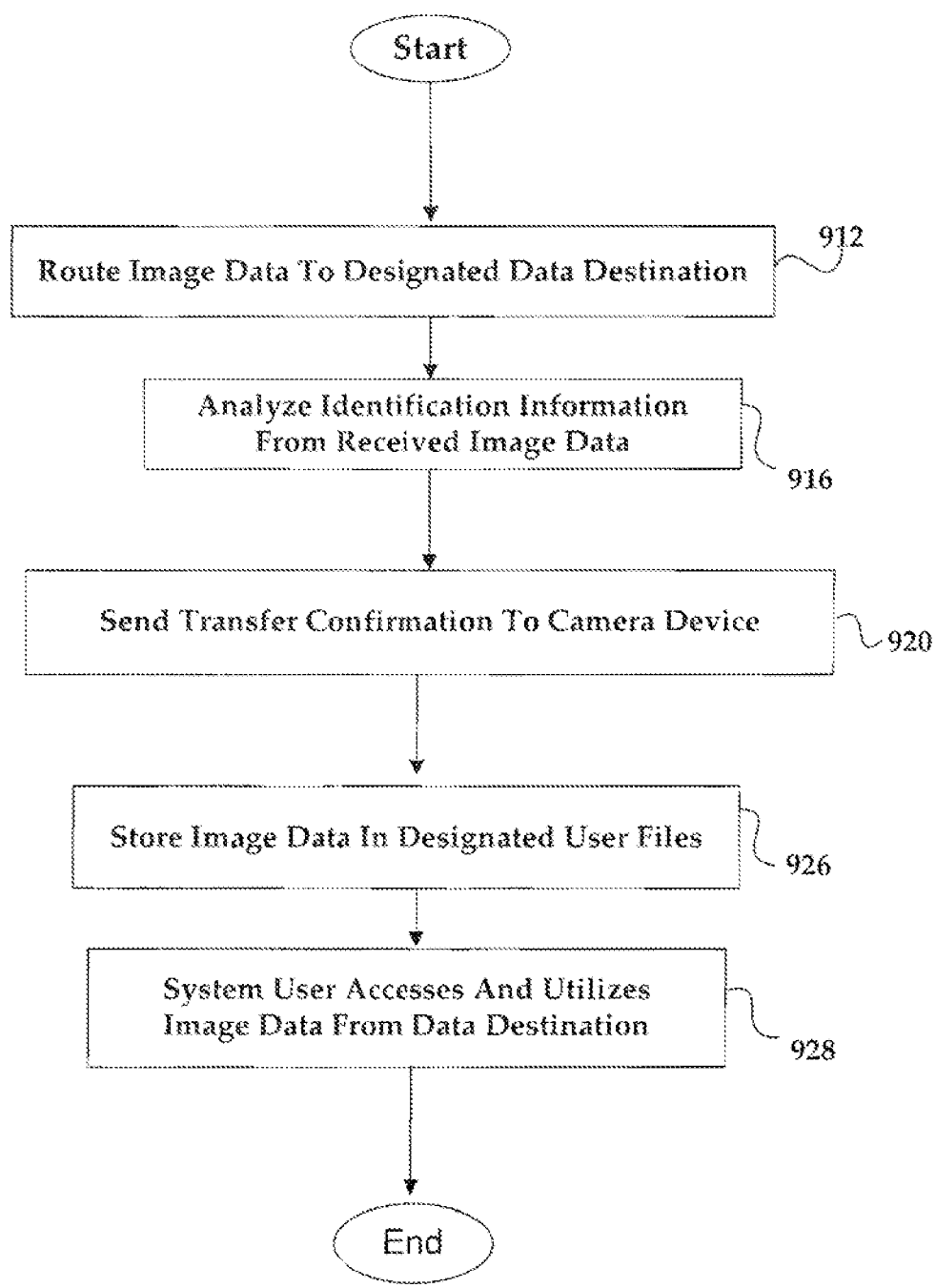
FIG. 9 is a flowchart of method steps for receiving data from an electronic camera device, in accordance with one embodiment of the present invention.

The related method steps of FIGS. 8 and 9 are discussed in the context of a single camera device 110 that provides a single transfer of captured information to data destination 710. However, the utilization of data destination 710 to flexibly receive and store different types of information from a plurality of different types of peripheral devices is readily contemplated by the present invention.

Referring now to FIG. 9, a flowchart of method steps for receiving data from an electronic camera device 110 is shown, in accordance with one embodiment of the present invention. The FIG. 9 embodiment is presented for purposes of illustration, and, in alternate embodiments, the present invention may readily utilize various other steps and sequences than those discussed in conjunction with the FIG. 9 embodiment.

In the FIG. 9 embodiment, in step 912, the wireless network discussed above in conjunction with FIG. 8 may preferably route data 514 received from camera device 110 to a designated data destination 710. In the FIG. 9 embodiment, the wireless network may preferably refer to the destination identifier discussed above in step 812 of FIG. 8 to identify the designated data destination 710.

In step 916, after receiving data 514 from the wireless network, a controller 716 of data destination 710 may preferably analyze various identification information that may preferably be transmitted along with data 514. As discussed above with respect to descriptors 512 of FIG. 5, the foregoing identification information may preferably include a user identifier, such as an account number or a camera identification number, to enable controller 716 of data destination 710 to correctly store the received data 514 into an appropriate one of the data files 714 of data destination 710.

In step 920, after confirming that the transfer of data 514 and all related information from camera device 110 has been successfully completed, controller 716 of data destination 710 may preferably send a transfer confirmation via the wireless network to transfer manager 416 of camera device 110. Display manager 420 may responsively display a confirmation message on viewfinder 308 or user interface 640 of camera device 110. In the FIG. 9 embodiment, camera device 110 may preferably refrain from deleting data 514 from data buffers 422 until receiving a successful transfer confirmation from data destination 710.

In certain embodiments, if the transfer of data 514 and all related information from camera device 110 is not successful, then controller 716 of data destination 710 may preferably send a transfer error message via the wireless network to transfer manager 416 of camera device 110. Display manager 420 may responsively display a corresponding error message on viewfinder 308 or user interface 640 of camera device 110. Camera device 110 may then reattempt the transfer of data 514 from data buffers 422.

In step 926, after identifying the source of the transferred data 514 in foregoing step 916, controller 716 of data destination 710 may preferably store the transferred data 514 into a designated one of the data files 714 that corresponds to a particular system user or data source. Finally, in step 928, a system user may advantageously access and utilize data 514 from a dedicated one or more of data files 714, in accordance with the present invention. In the FIG. 9 embodiment, a system user may access a dedicated one of data files 714 using any effective technique(s). For example, a system user may utilize a personal computer device or a portable electronic device to access data destination 710 via an electronic wireless or hard-wired network.

The present invention therefore provides an efficient and effective way to circumvent certain burdensome difficulties often associated with storing and transferring image data via various types of local storage media. Instead, the present invention provides a user-friendly, trouble-free, and cost-effective method for transferring, accessing and utilizing captured image data through a wireless data transfer procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for transferring data, comprising:
an imaging device configured to capture said data into data buffers; and
a transfer manager of said imaging device for transferring said data from said imaging device to a data destination during a data transfer procedure, said transfer manager performing a repeat transfer procedure whenever said data destination fails to successfully receive all of said data, said transfer manager indicating to said data destination with an error notification that additional information from said data will subsequently be transmitted to complete said data transfer procedure.

2. The system of claim 1 wherein said transfer manager utilizes a wireless communications technique to transfer said data over a wireless network from said imaging device to said data destination.

3. The system of claim 1 wherein said imaging device is implemented as a digital camera device, and wherein said data includes image data and related identification information.

4. The system of claim 1 wherein an information source provides identification information to said imaging device for routing said data during a data transfer procedure, said identification information including a user identifier for identifying said imaging device and a destination identifier for identifying said data destination.

5. The system of claim 4 wherein said imaging device captures said data using a capture subsystem, and then temporarily stores said data into data buffers, said data buffers being economically implemented using a reduced memory-size configuration.

6. The system of claim 5 wherein said transfer manager performs an arbitration procedure with a wireless communications network to transfer said data to said data destination, said transfer manager being authorized by said wireless communications network to perform said data transfer procedure when sufficient bandwidth is available on said wireless communications network for transferring all or a specified portion of said data.

7. The system of claim 6 wherein said transfer manager monitors said data buffers, and automatically initiates said arbitration procedure whenever said data stored in said data buffers reaches a predetermined threshold amount, said transfer manager transferring said data in said data transfer procedure if a total amount of said data stored in said data buffers is greater than a predetermined threshold amount that is not subject to specific threshold-selection size limitations.

8. The system of claim 6 wherein said transfer manager initiates said arbitration procedure in response to a system-user authorization event that is caused by a system user activating a user interface on said imaging device.

9. The system of claim 7 wherein said transfer manager transfers said data from said data buffers to said wireless communications network for transmitting to said data destination.

10. The system of claim 9 wherein said transfer manager and a display manager provide status information regarding said data transfer procedure and said arbitration procedure by utilizing a user interface of said imaging device.

11. The system of claim 9 wherein said transfer manager, because of bandwidth limitations of said wireless communications network, performs an initial partial data transfer procedure to transfer only an initial portion of said data to said data destination, said transfer manager subsequently repeating said arbitration procedure and then performing a final partial data transfer procedure to transfer a final portion of said data to said data destination, when sufficient additional bandwidth is available.

12. The system of claim 9 wherein said wireless communications network routes said data from said imaging device to said data destination, said wireless communication network identifying said data destination by referring to said destination identifier from said identification information.

13. The system of claim 12 wherein a controller of said data destination sends a transfer confirmation to said imaging device by said wireless communications network after successfully receiving said data and said identification information.

14. The system of claim 13 wherein said transfer manager and a display manager display said transfer confirmation on a user interface of said imaging device, said imaging device also erasing said data from said data buffers in response to said transfer confirmation.

15. The system of claim 12 wherein a controller of said data destination sends an error message to said imaging device by said wireless communications network after determining that said data and said identification information have not been successfully received, said transfer manager responsively repeating said data transfer procedure to retransmit said data from said data buffers to said data destination until said data transfer procedure is successfully completed.

16. The system of claim 15 wherein said transfer manager and a display manager display said error message on a user interface of said imaging device, said imaging device continuing to store said data in said data buffers until subsequently receiving a transfer confirmation from said data destination.

17. The system of claim 9 wherein a controller of said data destination analyzes said user identifier from said identification information to identify at least one of said system user and said imaging device, said controller then associating said data with said at least one of said system user and said imaging device.

18. The system of claim 17 wherein said controller stores said data into a data file location that uniquely correspond with, and is identifiable with, said at least one of said system user and said imaging device.

19. The system of claim 18 wherein said system user subsequently accesses and utilizes said data from said data file location of said data destination by communicating with said data destination with an electronic data-access device.

20. A method for transferring data, comprising the steps of:
capturing said data into data buffers by utilizing an imaging device;
utilizing a data destination during a data transfer procedure to receive said data for subsequent access by a system user; and
transferring said data from said imaging device to said data destination by utilizing a transfer manager of said imaging device, said transfer manager performing a repeat transfer procedure whenever said data destination fails to successfully receive all of said data, said transfer manager indicating to said data destination with an error notification that additional information from said data will subsequently be transmitted to complete said data transfer procedure.

\* \* \* \* \*